(12) United States Patent
Willach et al.

(10) Patent No.: US 6,478,186 B1
(45) Date of Patent: Nov. 12, 2002

(54) AUTOMATIC DISPENSER

(75) Inventors: Ulrich Willach, Neunkirchen-Seelscheid (DE); Werner Schmitt, Ruppichteroth-Schönenberg (DE)

(73) Assignee: Gebr. Willach GmbH, Ruppichteroth (DE)

( * ) Notice: Subject to any disclaimer, the term of this patent is extended or adjusted under 35 U.S.C. 154(b) by 69 days.

(21) Appl. No.: 09/722,436

(22) Filed: Nov. 28, 2000

(30) Foreign Application Priority Data

Dec. 11, 1999 (DE) .................................. 299 21 764 U

(51) Int. Cl.[7] .............................................. G07F 11/00
(52) U.S. Cl. ......................................... 221/13; 221/123
(58) Field of Search ........................... 221/2, 7, 13, 15, 221/87, 88, 69, 123, 131, 92; 700/231, 232; 211/128.1

(56) References Cited

U.S. PATENT DOCUMENTS 4,546,901 A * 10/1985 Buttarazzi .................... 221/13
5,031,781 A * 7/1991 Price et al. ................. 211/128

FOREIGN PATENT DOCUMENTS

DE 299 04 863 U1 3/1999

* cited by examiner

*Primary Examiner*—Kenneth W. Noland
(74) *Attorney, Agent, or Firm*—Diller, Ramik & Wight

(57) ABSTRACT

The automatic dispenser comprises at least one rack (10) provided with inclined shelves (14) containing the items (26). A manipulator (18) is controllably movable at the front side of the rack for gripping under the first item and take it out of the inclined shelf. The manipulator (18) conveys the item (26) to one of at least two dispensing locations (22A, 22B). From each dispensing location an individual conveyor path leads to a place of destination. The dispensing locations (22A, 22B) are positioned at the front side of the rack (10). The rear side (27) of the rack opposite to the free space (17) is accessible for filling the inclined shelves (14) without the dispensing operation being impeded.

12 Claims, 3 Drawing Sheets

AUTOMATIC DISPENSER

BACKGROUND OF THE INVENTION

The present invention relates to a dispenser for dispensing items, in particular in pharmacies, such that the pharmacist needs not run around and search for the respective items.

In DE 299 04 863 an automatic dispenser is described which comprises a rack having inclined shelves arranged one above the other and a manipulator movable in a free space in front of the inclined shelves, the manipulator allowing controlled removal of items. The manipulator conveys the removed items to a transfer device transferring the items from the front side of the rack to the rear side thereof. A selection device is provided which allows selection of one of a plurality of dispensing locations to which the item is to be tranferred. Each of said dispensing locations is allocated to a different dispensing place. Depending on the dispensing place which has issued the command for supplying an item said item removed from the rack is fed to the respective dispensing location and then transported via a conveyor path from the dispensing location to the dispensing place. From the dispensing place the pharmacist may request an item to be supplied, the item then being fed by the automatic dispenser to this dispensing place. This allows the pharmacist to conduct a consultation with the client and to request supply of a plurality of medicines in order to explain to the client the effects of said medicines. The automatic dispenser is limited to a single rack. To attain a larger storing capacity the overall automatic dispenser plus the conveyor paths would have to be twice or many times as large as they are hitherto.

Rack systems used in pharmacies are known where racks having inclined shelves are arranged such that their take-off sides face each other. Controlled blocking devices are provided at the inclined shelves, which release the lowermost item on a shelf. Said item drops onto a conveyor which may be connected via a conveyor system comprising switches with a plurality of dispensing places. Said automatic dispenser requires a sophisticated control unit for indexing each item from the storage place to the place of destination. To ensure that the conveyor unit is not blocked for too long all items belonging to one order are simultaneously supplied to the dispensing place. If the items were individually supplied to the dispensing place, the switch setting would, for an extended period of time, prevent the overall conveyor system from being available for the purpose of dispensing other items to other dispensing places.

It is an object of the present invention to provide an automatic dispenser having a large storage capacity and being capable of conveying items individually and in rapid succession to a plurality of dispensing places.

SUMMARY OF THE INVENTION

The dispenser according to the invention comprises various conveyor paths each of which is allocated to a place of destination. This means that one conveyor path leads from the rack to the respective place of destination. At the place of destination the conveyor paths may be split up into paths leading to different dispensing places, if required. Normally two dispensing places are sufficient for a pharmacy system. In this case the conveyor paths lead directly to the respective dispensing place without any switches being provided, with the dispensing place being the place of destination. The automatic dispenser comprises a plurality of racks with a first dispensing location being connected with a first conveyor path and a second dispensing location being connected with a second conveyor path. Depending on the dispensing location to which the manipulator of the respective rack transfers the item removed, said item is transported via a predetermined and invariable conveyor path to the place of destination selected in accordance with the dispensing location.

The automatic dispenser allows any number of racks to be added. Said racks must be connected via corresponding conveyor tracks to the conveyor paths. It is however not necessary to coordinate the control units of the additional racks or to connect them into a network. Each rack supplies its products to the conveyor paths independent of the other racks.

The automatic dispenser according to the present invention allows individual products to be very rapidly conveyed from a rack to the respective dispensing place without the conveyance of other products to the same dispensing place or other dispensing places being impeded. Further, the automatic dispenser allows the pharmacist to remove individual products for the purpose of explanation only and to manuall return them to the rack.

A particular advantage is that the racks and their respective manipulators and control and operating means operate independently of each other such that items can be dispensed in rapid succession or even simultaneously. Since each conveyor path is allocated to its own place of destination and no switches or crossing points are provided, pile-ups cannot occur. If a control unit is required for conveying the items via the conveyor paths to the respective places of destination, said control unit operates independently of the control and operating means of the indivdual racks and manipulators respectively. For example, a conveyor belt provided in a conveyor path may be equipped with a light barrier control which places the belt drive into operation when an item is put onto the belt. It is also possible to use continuously running conveyor belts or conveyor tracks in the form of chutes or tubes.

In most cases it suffices to supply two places of destination. In this case two conveyor paths are provided and each rack has two dispensing locations. It is however possible to increase the number of places of destination. In this case the number of conveyor paths and dispensing locations of each rack is also increased.

If the racks are located on the upper floor of a pharmacy, the conveyor paths may be exclusively configured as slides.

In a preferred embodiment of the present invention the racks are provided with their own control and operating means and operate independently of each other. The individual racks may be configured as shelve modules forming a cubicle. They receive from the goods handling computer used in the pharmacy the request to transfer a product positioned at a certain location on the rack to a certain dispensing location. The entire transport is automatically carried out by the control and operating means of the rack. Thus the individual rack modules can be operated parallel to each other and independently from each other. A special advantage offered by this configuration is that an automatic dispenser, which may, inter alia, be a complete store, can be extended by any number of rack modules.

Preferably the dispensing locations from where individual conveyor paths lead to the respective places of destination are provided on the front side, i. e. the take-off side, of the rack, while the rear side of the rack is accessible for the purpose of filling the inclined shelves without impeding the dispensing operation. A special advantage is that the conveyor paths start on the front side of the rack such that the rear side is not blocked by conveyor means. While the manipulator is operating on the front side of the rack, items can be placed onto the rack from the rear side.

One advantage is that manual access to the products on the rack is possible at any time even in the event of failure of the manipulator or one of the conveyor means. Another advantage is that items need not be transferred from the front side to the rear side of the racks.

Preferably at least two racks are arranged back to back at a distance to each other with a passage being provided between the racks. Said passage preferably extends on an elevated platform below which a conveyor is arranged. On the platform persons may walk and stand without the conveyor standing in their way.

The manipulator can be controlled such that it moves to the respective dispensing location in dependence on the selected place of destination. This offers the advantage that the selection of the place of destination is carried out by the manipulator or its control unit and that no additional selection means is required. However it is also possible to provide a single dispensing location on the rack to which the manipulator feeds all items, and to provide an additional selection means which dispenses the items via a switch or similar in dependence on the place of destination.

BRIEF DESCRIPTION OF THE DRAWINGS

Hereunder an embodiment of the present invention is explained in detail with reference to the drawings in which.

DESCRIPTION OF THE PREFERRED EMBODIMENT

Figure 1:
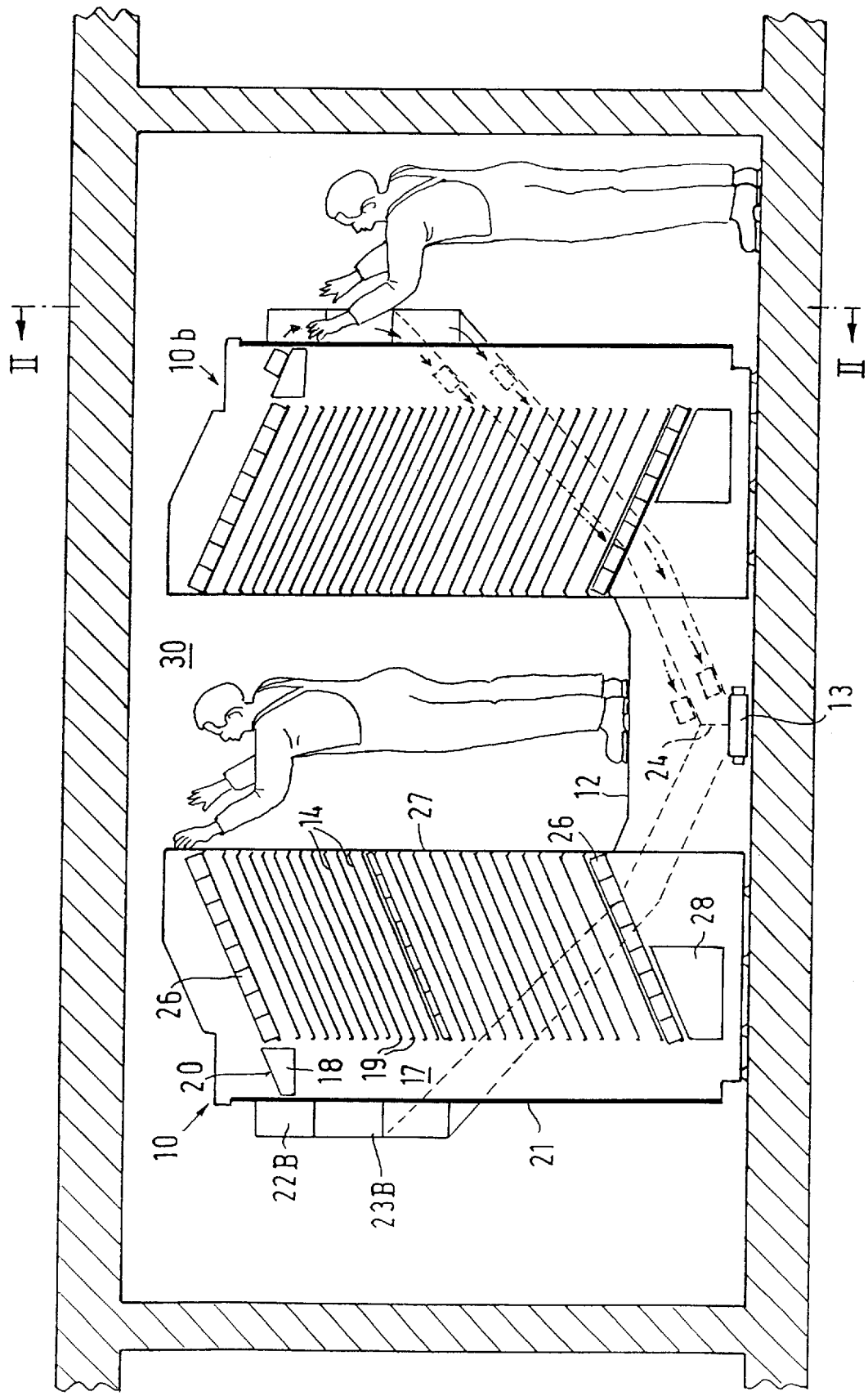
FIG. 1 shows a schematic cross-section of an automatic dispenser.
Figure 2:
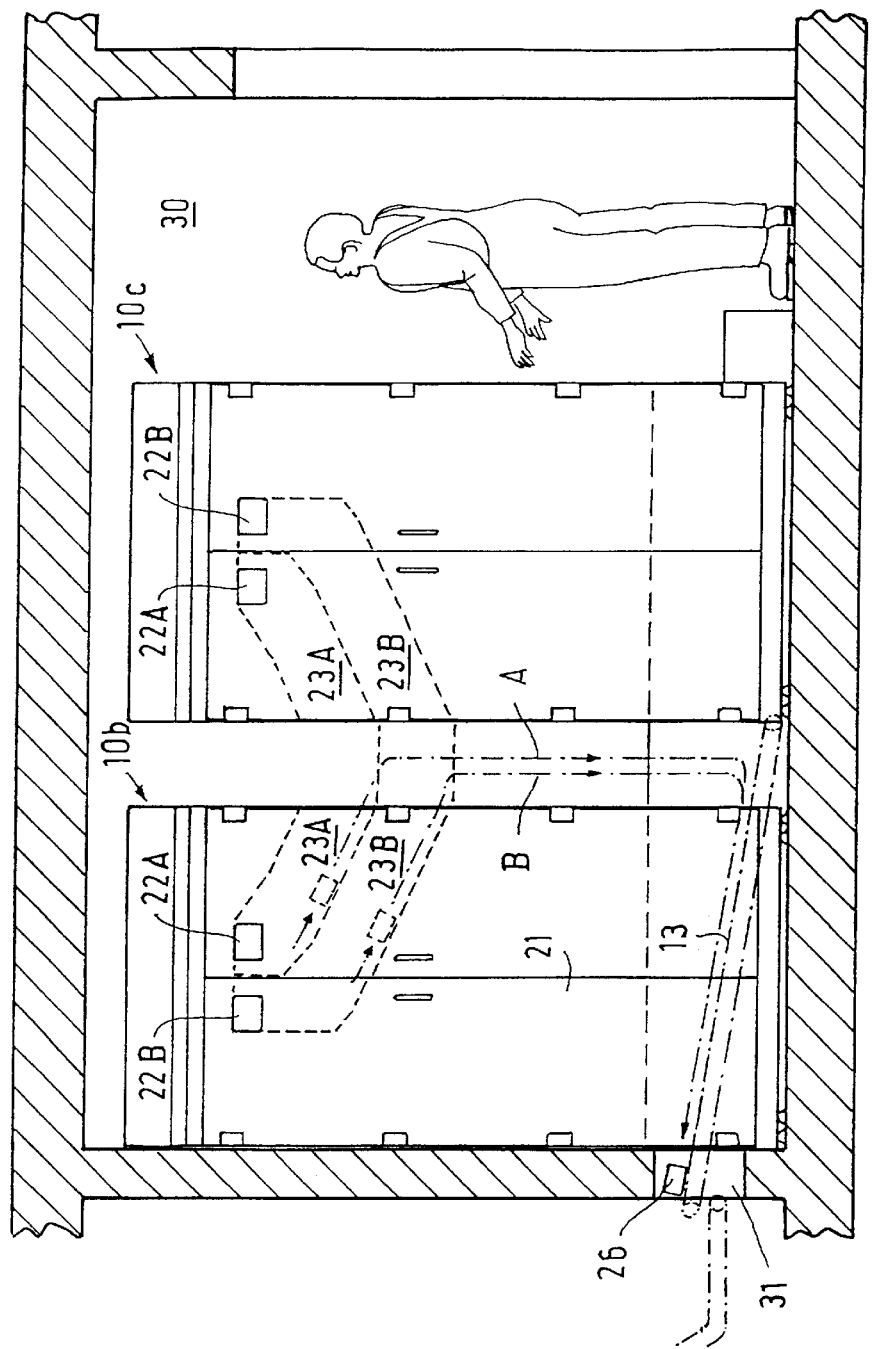
FIG. 2 shows a section along line II—II of FIG. 1.
Figure 3:
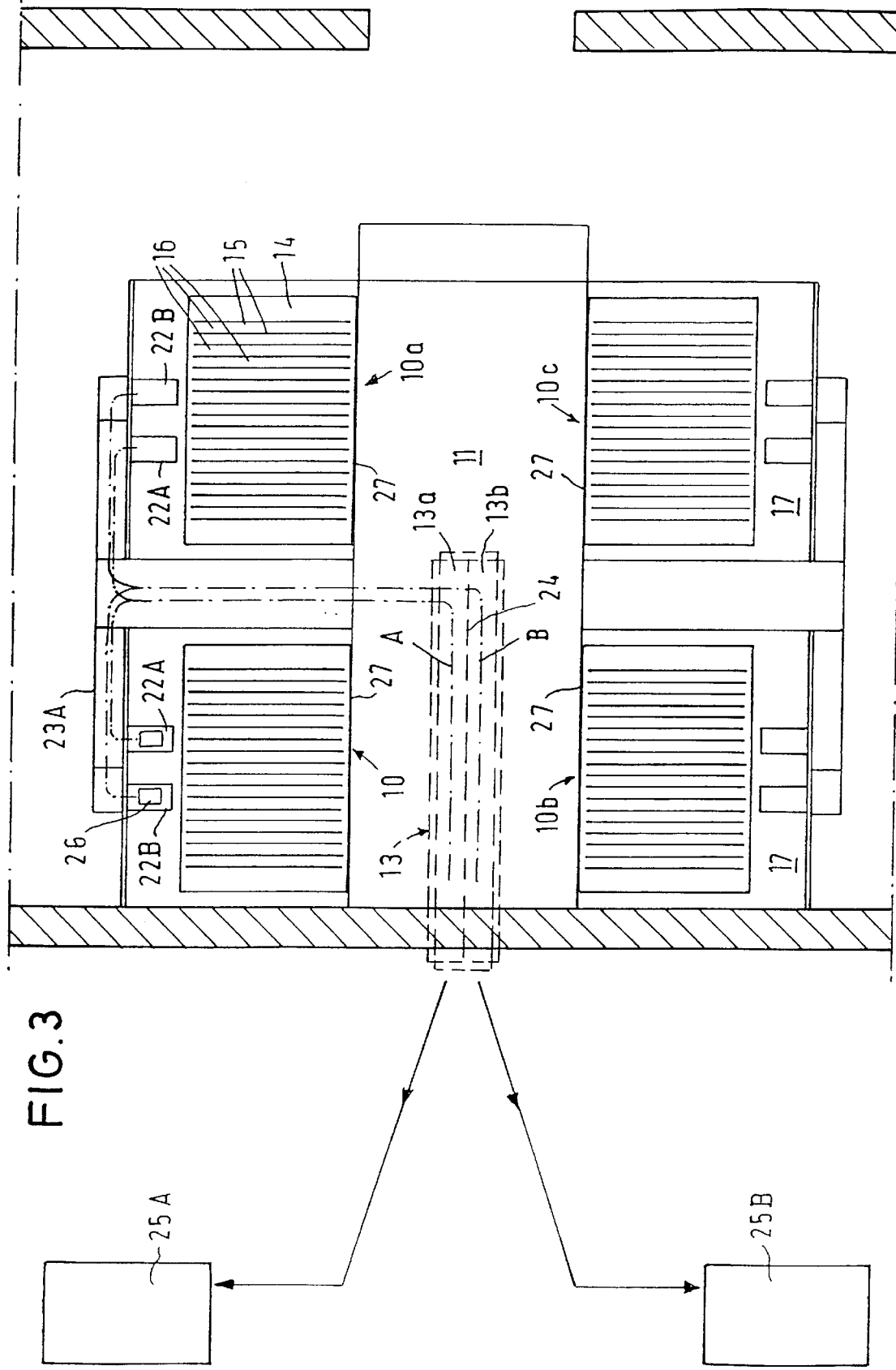
FIG. 3 show a schematic plan view of the automatic dispenser.

The automatic dispenser comprises four racks 10, 10a, 10b and 10c of identical configuration such that hereinafter only rack 10 is referred to. The racks are arranged in pairs opposite each other on both sides of a passage 11. Said passage 11 extends on a platform 12 arranged at a distance above the floor and below which a conveyor 13 is provided.

The inclined-shelf rack 10 is generally configured in the same way as that described in DE 299 04 863. It comprises a number of inclined shelves 14 arranged one above the other and provided with partitions 15. Said partitions 15 define storage channels 16 descending towards the dispensing side. Into each storage channel 16 a different item, e. g. a different medicine, is placed.

On the dispensing side, i. e. the front side, of the rack 10 a free space 17 is provided in front of the inclined shelves 14 in which a manipulator 18 can be controllably moved. The manipulator 18 is moved by a drive means (not shown) in a vertical plane in X and Y-direction in accordance with a system of coordinates. It can be positioned in front of each inclined shelf 14, i. e. selectively in front of each storage channel 16 of an inclined shelf 14. The manipulator 18 comprises a tripping device (not shown) by means of which it grips under the first object on the inclined shelf 14 and lifts it over a stop portion 19 such that said item slides under gravity onto the supporting surface 20 of the manipulator 18. The item then rests against a door 21 which closes the front side of the rack. The door contains two dispensing locations 22A, 22B arranged side by side at the same level. The dispensing locations 22A, 22B are holes in the door 21. A conveyor channel 23A, 23B adjoins each hole. Said conveyor channels form part of a conveyor path A, B which also extends over the conveyor 13. The conveyor 13 is a belt conveyor divided into two halves 13a and 13b by a partition 24. On the dispensing side of the conveyor 13 the conveyor paths A and B diverge. Conveyor path A leads to the dispensing location 25A and conveyor path B leads to the dispensing location 25B. In the present embodiment each dispensing location forms a place of destination.

In the case described four racks are provided in the form of rack modules of identical design which are configured as independent cubicles. The items 26 are located on the inclined shelves 14 which ascend from the take-off side, i. e. the free space 17, to the rear. The rear side 27, where the inclined shelves 14 are at their highest level, faces the passage 11. The rear side is open or provided with an easy-to-open door such that from the platform 12 a person can refill the upper ends of the inclined shelves with items 26.

Below the lowermost inclined shelf the control and operating means 28 and the power supply unit of the rack are accommodated. Each rack controls its own manipulator 18 automatically and independently of the other racks.

The individual racks 10, 10a, 10b, 10c are arranged in pairs on both sides of the passage 11 with the rear sides 27 facing each other. Between two racks located on the same side of the passage the conveyor paths extend in the form of conveyors, chutes or similar from the front side to the rear side 27 where the conveyor 13 is arranged.

The racks are accommodated in a room 30 having a wall opening 31 through which the items 26 are transported to the respective dispensing place 25A, 25B.

Control of the dispensing processes on the racks is effected by a programmable control unit for each rack contained in the control and operating means 28. The control units of the individual racks operate independently of each other. They communicate with each other via a field bus. The bus system is connected via an interface to the goods handling computer of the pharmacy. When a pharmacist requests a product from a dispensing place, the goods handling computer transmits the rack number, the storage channel number, the quantity and the number of the dispensing place to the bus system. This request is sent to the control units of all racks but only the manipulator of the rack addressed carries out said request. The control unit of said manipulator issues the command that a product positioned at a certain location on the rack is to be transferred to a certain dispensing location. If a rack receives a request before a previous request issued to the same rack has been carried out, the new request is stored in the control unit of the rack and then carried out immediately after execution the foregoing request. This ensures that the goods handling computer needs not wait until requests have been carried out.

A special advantage is that each rack can be filled with items from the rear side during operation, as can be seen in FIG. 1. In the event of failure of one rack the other racks continue to operate. It is nevertheless possible to manually take items 26 out of the failed rack. For this purpose the front doors 21 can be opened. The conveyor channels 23A and 23B are of flexible configuration such that they allow the doors to be opened. The operator can then grasp the foremost objects 26 on a rack and take them out. The racks exceed a man's height and extend nearly up to the ceiling. From the platform 12 the uppermost inclined shelf is within hand's reach.

Although a preferred embodiment of the invention has been specifically illustrated and described herein, it is to be understood that minor variations may be made without departing from the spirit and scope of the invention, as defined in the appended claims.

What is claimed is:

1. Automatic dispenser comprising at least two racks (10, 10a, 10b, 10c) having inclined shelves (14) arranged one above the other, each inclined shelf having a front side and a rear side, a manipulator (18) movable in a free space (17) at the front side of the inclined shelves (14) for controlled removal of items (26), each rack (10) comprising at least two dispensing locations (22A, 22B) from where an individual conveyor path (A, B) each leads to a place of destination (25A, 25B), wherein each rack (10, 10a, 10b, 10c) comprises a first dispensing location (22A) which is exclusively connected to a first conveyor path (A) common to all racks and a second dispensing location (22B) which is exclusively connected to a second conveyor path (B) common to all racks.

2. Automatic dispenser according to claim 1 wherein each rack (10, 10a, 10b, 10c) is provided with its own control and operating means (28).

3. Automatic dispenser according to claim 1 wherein the at least two dispensing locations (22A, 22B) are arranged at the front side of the rack (10) and the rear side (27) of the rack (10) opposite to the free space (17) is accessible for the purpose of filling the inclined shelves (14) without the dispenser operation being impeded.

4. Automatic dispenser according to claim 1 wherein at least two racks (10, 10b) are arranged back to back at a distance to each other and a passage (11) is provided between the racks.

5. Automatic dispenser according to claim 4 wherein the passage (11) is provided on a platform (12) below which a conveyor (13) is arranged.

6. Automatic dispenser according to claim 1 wherein the manipulator (18) is controlled such that it accesses the respective dispensing location (22A, 22B) in dependence on the selected place of destination (25A, 25B).

7. Automatic dispenser according to claim 1 wherein the at least two dispensing locations (22A, 22B) are arranged at the front side of the at least two racks (10, 10a, 10b, 10c).

8. Automatic dispenser according to claim 1 wherein the at least two dispensing locations (22A, 22B) are arranged at the front side of the at least two racks (10, 10a, 10b, 10c), and said at least two racks (10, 10a or 10b, 10c) are in adjacent side-by-side relationship with the shelf front sides facing their associated manipulator (18) in the same direction.

9. Automatic dispenser according to claim 1 wherein the at least two dispensing locations (22A, 22B) are arranged at the front side of the at least two racks (10, 10a, 10b, 10c), and said at least two racks (10, 10b or 10a, 10c) are in adjacent back-to-back relationship with the shelf front sides facing their associated manipulator (18) in different directions.

10. Automatic dispenser according to claim 9 wherein said back-to-back at least two racks (10, 10b or 10a, 10c) are in spaced relationship to each other to thereby provide accessibility for filling the shelves from the rear side thereof.

11. Automatic dispenser according to claim 1 wherein said individual conveyor paths (A, B) are defined at least in part by a common conveyor (13).

12. Automatic dispenser according to claim 1 wherein said individual conveyor paths (A, B) are defined at least in part by a common conveyor (13), and means (24) associated with said conveyor (13) for conveying therewith items (26) from one of said dispensing locations (22A) along one (A) of said conveyor paths and for conveying therewith items (26) from another of said dispensing locations (22A) along the other (B) of said conveyor paths.

* * * * *